United States Patent
Park et al.

(10) Patent No.: US 9,319,322 B2
(45) Date of Patent: Apr. 19, 2016

(54) NETWORK DEVICE AND METHOD FOR PROCESSING TRAFFIC USING MULTI-NETWORK INTERFACE CARD

(75) Inventors: Sang-Kil Park, Daejeon-si (KR);
Joon-Kyung Lee, Daejeon-si (KR);
Dong-Won Kang, Daejeon-si (KR);
Sang-Sik Yoon, Daejeon-si (KR);
Sang-Wan Kim, Daejeon-si (KR);
Wang-Bong Lee, Daejeon-si (KR);
Jong-Dae Park, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 57 days.

(21) Appl. No.: 13/619,361

(22) Filed: Sep. 14, 2012

(65) Prior Publication Data

US 2013/0188635 A1 Jul. 25, 2013

(30) Foreign Application Priority Data

Jan. 20, 2012 (KR) ........................ 10-2012-0006974

(51) Int. Cl.
*H04L 12/56* (2006.01)
*H04L 12/815* (2013.01)
*H04L 12/823* (2013.01)
*H04L 12/813* (2013.01)
*H04L 12/851* (2013.01)

(52) U.S. Cl.
CPC ............ *H04L 47/20* (2013.01); *H04L 47/2441* (2013.01); *H04L 47/22* (2013.01); *H04L 47/32* (2013.01)

(58) Field of Classification Search
CPC ......... H04L 41/12; H04L 45/02; H04L 45/00; H04L 45/04; H04L 41/04; H04L 43/12; H04L 47/22; H04L 47/225; H04L 47/23; H04L 47/2458; H04L 47/2475; H04L 47/2483; H04L 12/54; H04L 49/252; H04L 2012/54; H04L 49/90
See application file for complete search history.

(56) References Cited

U.S. PATENT DOCUMENTS

| | | | | |
|---|---|---|---|---|
| 7,103,055 B2 * | 9/2006 | Kadambi | ................ | H04L 12/46 370/395.31 |
| 7,286,535 B2 * | 10/2007 | Ishikawa | ................. | H04L 47/10 370/351 |
| 7,719,966 B2 * | 5/2010 | Luft | ......................... | H04L 47/20 370/229 |
| 7,784,094 B2 * | 8/2010 | Balakrishnan | ........ | H04L 43/026 713/154 |
| 7,809,827 B1 * | 10/2010 | Apte | ...................... | H04L 43/028 370/390 |
| 8,284,662 B2 * | 10/2012 | Sargor | ................... | H04L 43/026 370/230.1 |
| 8,307,418 B2 * | 11/2012 | Devdhar | ............. | H04L 63/0236 370/235 |
| 8,644,151 B2 * | 2/2014 | Foschiano | ........... | H04L 63/1441 370/232 |
| 2002/0002438 A1 * | 1/2002 | Ohmura | ............. | G01C 21/3682 701/532 |
| 2007/0204036 A1 * | 8/2007 | Mohaban | ................ | H04L 12/66 709/224 |
| 2008/0077705 A1 * | 3/2008 | Li | ........................... | H04L 47/10 709/236 |
| 2011/0149776 A1 * | 6/2011 | Park | ...................... | G06F 13/385 370/252 |
| 2012/0106562 A1 * | 5/2012 | Laor | ....................... | H04L 49/10 370/401 |

* cited by examiner

*Primary Examiner* — Candal Elpenord
(74) *Attorney, Agent, or Firm* — Nelson Mullins Riley & Scarborough LLP; Anthony A. Laurentano; Michael Malone

(57) ABSTRACT

A method for processing traffic using a multi-network interface card and a network device employing the method are provided. The network device includes a first network card configured to classify and filter traffic, a second network card configured to inspect and process the traffic classified by the first network card, a processor configured to manage the first and second network cards and apply network policies to the first and second network cards, respectively, and a memory configured to store the network policies.

13 Claims, 6 Drawing Sheets

NETWORK DEVICE AND METHOD FOR PROCESSING TRAFFIC USING MULTI-NETWORK INTERFACE CARD

CROSS-REFERENCE TO RELATED APPLICATION

This application claims the benefit under 35 U.S.C. §119(a) of Korean Patent Application No. 10-2012-0006974, filed on Jan. 20, 2012, the entire disclosure of which is incorporated herein by reference for all purposes.

BACKGROUND

1. Field

The following description relates to network management and service technology, and more particularly, to network traffic processing technology.

2. Description of the Related Art

In today's network lines, there is a need for intelligent inspection and control of bandwidth and traffic. While the profit of a network line provider does not improve with increase in the number of smart phones or tablet PCs, the traffic caused by content providers and end users increases geometrically. In this network environment, network operators require a traffic engineering technique that provides network QoS (Quality of Service) and security for a large quantity of traffic using a limited network bandwidth and performs billing, etc. It is preferable for cost to be paid by agreement between a network operator and a service provider, but in fact, the network operator should increase continuous network infrastructure even when there is no economic profit.

Network equipment which mainly developed nowadays includes switches, routers, inline appliances with specialized functions, security equipment, traffic accelerators, etc. Such equipment is hardware and performs specific functions for an ASIC (Application Specific Integrated Chip), a FPGA (Field Programmable Gate Array), an NPU (Network Processor Unit), a Multi-core Processor, or a Many-Core Processor, to provide intended functions.

Flexibility to configure networks according to the volume of traffic and network lines, effective traffic inspection and control are essential. In particular, devoted traffic transfer with high response speed according to the location of a network, and precise traffic inspection are required.

U.S. Pat. No. 7,809,827 discloses a legal eavesdropping technology that filters and analyzes traffic through a probe performing a large amount of network monitoring.

SUMMARY

The following description relates to a network management and service technology.

In one general aspect, to efficiently provide a network service in a network device providing services at high speed, a method for processing traffic using a multi-network interface card and a network device employing the method are proposed.

A network device according to an aspect includes a first network card configured to classify and filter traffic, a second network card configured to inspect and process the traffic classified by the first network card, a processor configured to manage the first and second network cards and apply network policies to the first and second network cards, respectively, and a memory configured to store the network policies.

A traffic processing method according to a further aspect includes classifying and filtering traffic at a first network card, and inspecting and processing the traffic classified by the first network card at a second network card.

According to an embodiment, it is possible to efficiently provide a network service at low cost due to the performance of high-speed traffic classifying and filtering using a multi-network card, and traffic engineering for specific applications in a network.

Further, it is possible to reduce a load on an NIC as the volume of traffic decreases through first traffic classifying and filtering on high-performance traffic through an ASIC, FPGA, or NPU realized by mounting the NIC on a general server, and as traffic engineering is performed through secondary inspection.

Further, through network line connection enabling various combinations of NIC-type hardware, it is possible to provide various configurations according to a user environment by separating traffic classifying and filtering from traffic engineering.

Further, even though there is no purchase of additional equipment in applying the present invention to the inline or tap-type equipment of a network, it is possible to provide physical and logical structures that can respond to traffic continuously through the packet transfer related port connection of a FPGA or NPU in an NIC and rapidly respond to user requirements.

Other features and aspects will be apparent from the following detailed description, the drawings, and the claims.

Figure 1:
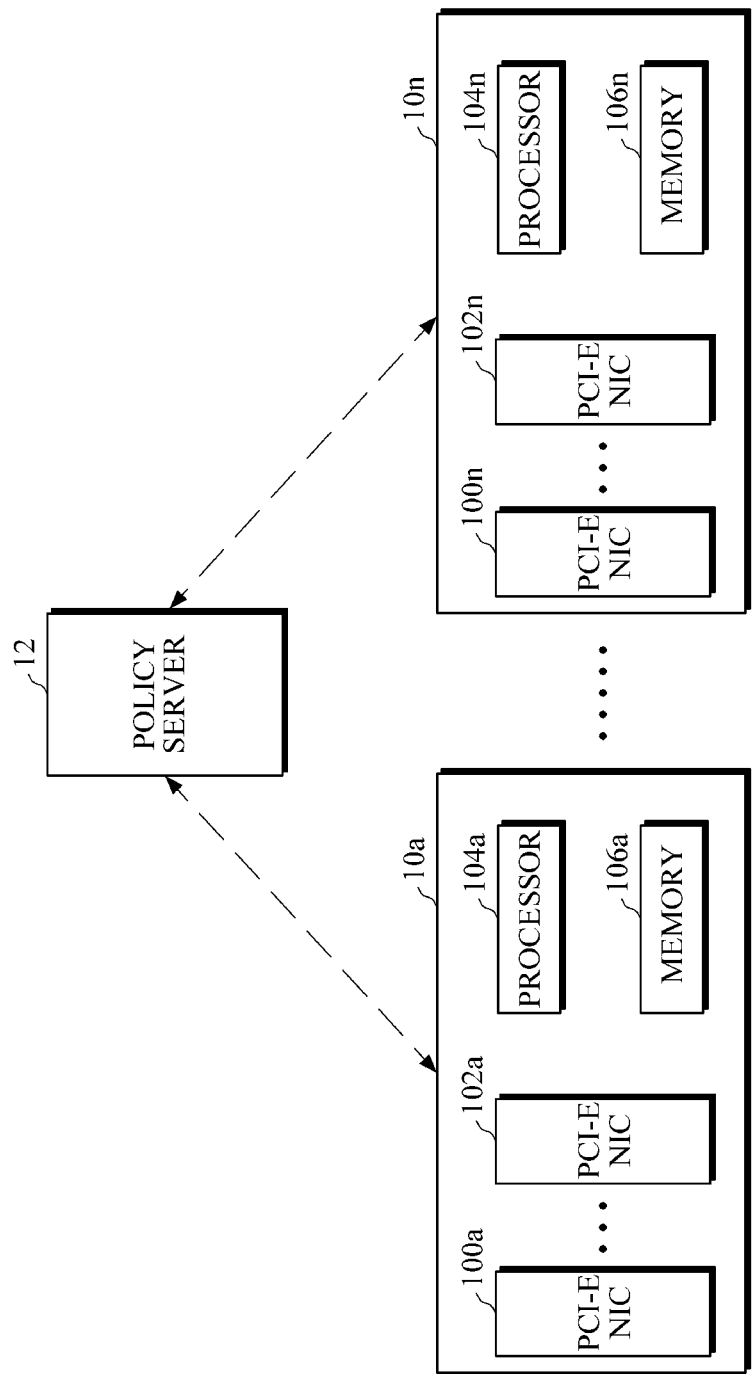
FIG. 1 is a diagram illustrating an example of a network environment to which the present invention is applied.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

Embodiments of the present invention are described in detail with reference to the attached drawings. In describing the present invention, detailed description on related known functions or configurations would be omitted if it is determined that such description can make the core of the present invention unclear. In addition, terms to be used are defined by considering the functions of the present invention and may be changed according to intentions of users and operators, or practices. Thus, such definition would be made based on the context throughout the specification.

FIG. 1 is a diagram illustrating an example of a network environment to which the present invention is applied.

In a network environment providing various services, two user requirements emerge: precise inspection of traffic and network performance. While satisfying both requirements in this situation has become quite complicated, the present invention provides hardware that can operate according to user requirements by installing various NICs (Network Interface Cards) with each feature in a server, and a utilization method thereof.

The inline or tap-type equipment of a network provides functions of billing, QoS management, security service, application acceleration through precise inspection of traffic distributed to the network.

In particular, a policy server 12 provides self-defined policies for each of general servers 10a, . . . 10n through a policy-related interface.

The general servers 10a, . . . 10n have network interface cards 100a, 102a, . . . 100n, 102n, which implement policies in a network. A policy-receiving and NIC-controlling module operating in the processors 104a, . . . 104n of the general servers 10a, . . . 10n processes the policies to become a policy structure suitable for each of the NICs 100a, 102a, . . . 100n, 102n, stores them in a storage device including memories 106a, . . . 106n, etc., and then implements network policies through the NICs 100a, 102a, . . . 100n, 102n. The NICs 100a, 102a, . . . 100n, 102n provide traffic classifying, analyzing and services regarding traffic connected to the network of the NICs 100a, 102a, . . . 100n, 102n from when a specific policy is implemented.

Figure 2:
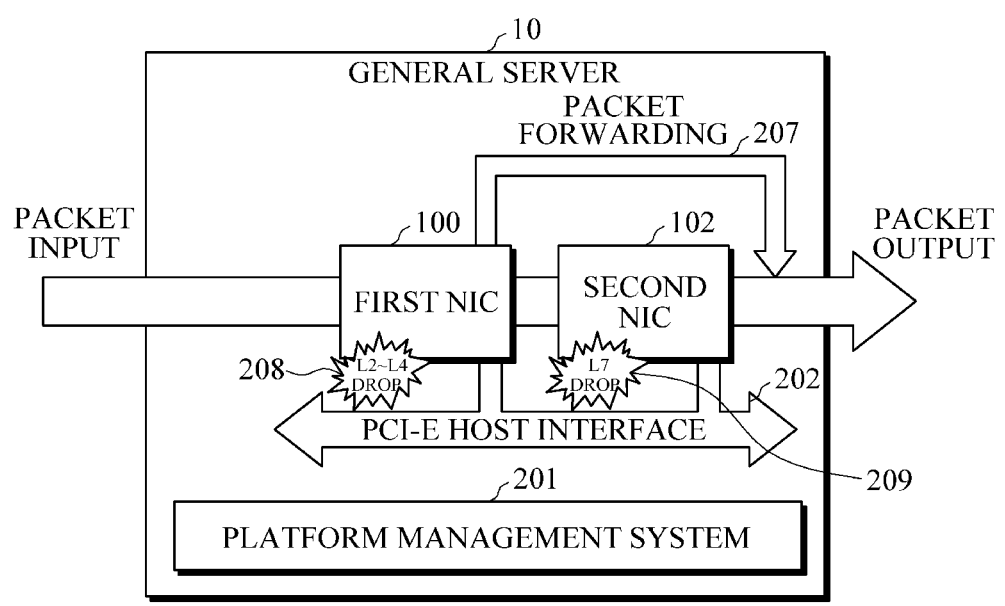
FIG. 2 is a diagram illustrating an example of the logical structure of a server processing traffic using multi-NIC according to an embodiment of the present invention.

FIG. 2 is a diagram illustrating an example of the logical structure of a server processing traffic using multi-NIC according to an embodiment of the present invention.

If NICs 100 and 102 are installed in the PCI slot 202 of a general server 10, a platform management system 201 manages ID identifying each of the INCs 100 and 102, and applies various network policies received from the policy server 12 to each of the NICs 100 and 102, respectively. The network policies can include traffic classifying, filtering and application policies.

According to an embodiment, the NICs 100 and 102 include four or more physical ports SFP and SFP+. The physical structure of the NICs 100 and 102 will be depicted in FIG. 3. A first NIC 100 performs traffic classifying and filtering with a traffic classifying policy corresponding to layer 2 to layer 4 of traffic input to the general server 10 from a management network. A second NIC 102 performs precise inspection of traffic pattern and traffic engineering on layer 5 to layer 7, and transmits or discards traffic.

First, the first NIC 100 classifies and filters traffic with layer 2 to layer 4 data on traffic incoming from a network, and transmits any packets incoming from the network that require precise inspection to the second NIC 102. According to an embodiment, the first NIC 100 discards in operation 208 any packets matching a filtering policy corresponding to layer 2 to layer 4 of packets not requiring precise inspection, and transmits in operation 207 non-matching packets to the network through a network output interface.

Figure 3:
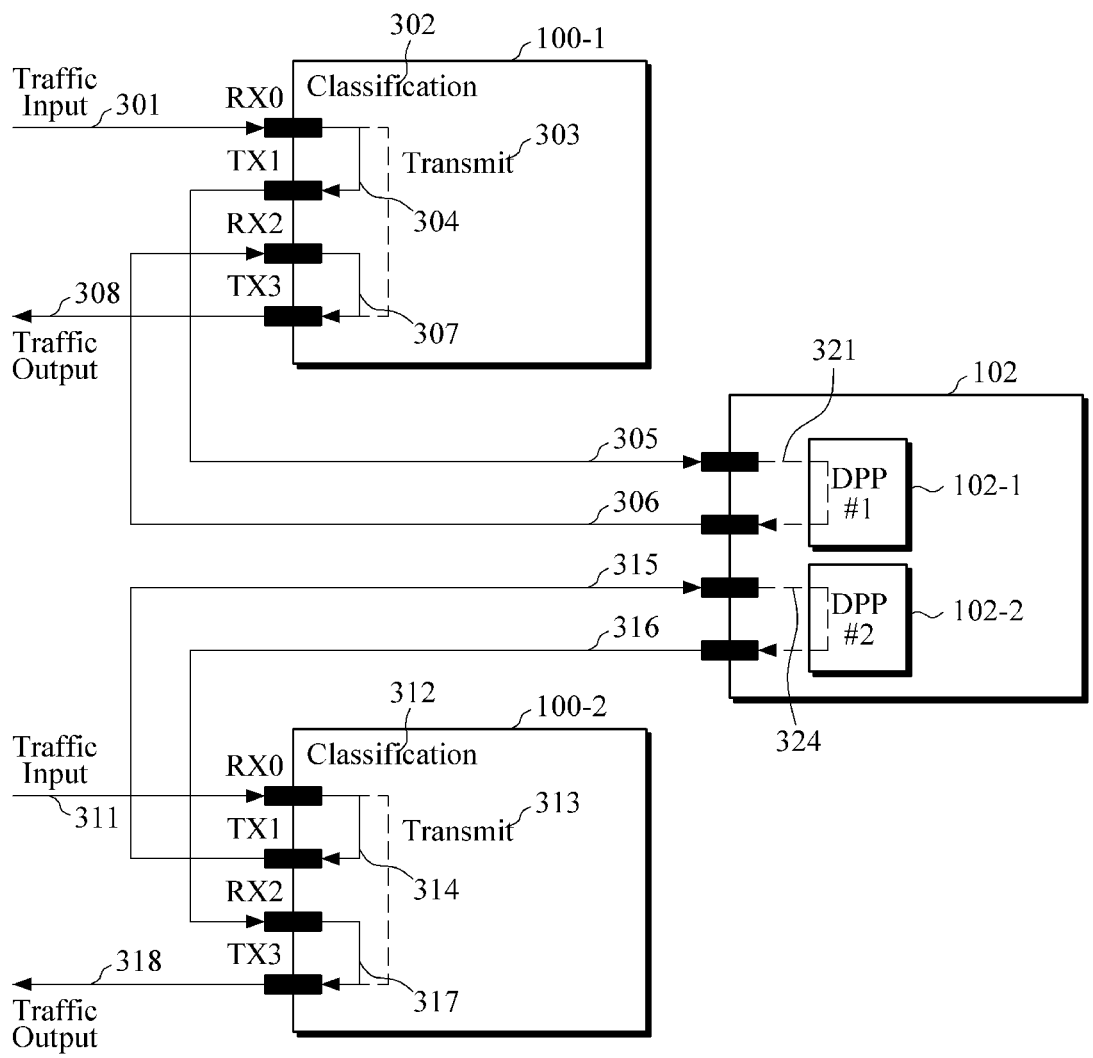
FIG. 3 is a diagram illustrating an example of the physical structure of an NIC connected through a practical network line according to an embodiment of the present invention.

FIG. 3 is a diagram illustrating an example of the physical structure of NIC connected through a practical network line according to an embodiment of the present invention.

In particular, FIG. 3 shows a traffic line connection and traffic flow between first NICs 100-1 and 100-2 with main functions of traffic classifying and filtering, and the second NIC 102 performing precise inspection and engineering of traffic.

Multi-NICs used in the present invention include four physical ports SFP, SFP+, etc. In other words, first NICs 100-1 and 100-2 include a physical port RX0 for receiving packets from a network, another physical port TX3 for transmitting packets to the network, and another physical port RX2 for receiving packets from the second NIC 102. In addition, the second NIC 102 classifies four traffic interfaces and receives packets from the first NICs 100-1 and 100-2 or transmits packets to the first NICs 100-1 and 100-2. The second NIC 102 can be logically divided into two sub blocks, DPP (Deep Packet Processing) engines 102-1 and 102-2.

The first NICs 100-1 and 100-2 receive packets from the network as indicated by reference numerals 301 and 311. Then, the received packets are classified in operations 302 and 312 based on the contents of packet headers on the packets. As a result of classifying the packets, packets requiring traffic engineering are transferred to the second NIC 102 through an inner port connection as indicated by reference numerals 304 and 314. In addition, the first NICs 100-1 and 100-2 remove from the first NICs 100-1 and 100-2 any packets not corresponding to traffic classification in operations 302 and 312 of packets filtered by second to fourth layers policy. Normal traffic is transmitted in operations 303 and 313 to network output interfaces 308 and 318.

The second NIC 102 precisely inspects a packet payload of all traffic using a specific technology providing protocol parsing and content matching for a specific service corresponding to fifth to seventh layers requested by a server, for traffic received from the first NICs 100-1 and 100-2 as shown by reference numerals 305 and 315. In addition, traffic discarding, packet transmission or packet transfer to a network are performed based on application policies according to results of precise inspection.

If the second NIC 102 is logically divided into two DPP engines 102-1 and 102-2, DPP #1 102-1 receives and processes packets from the first NIC 100-1 as indicated by reference numeral 305, and transmits the packets to one first NIC 100-1 as indicated by reference numeral 306 if necessary. Likewise, DPP #2 102-2 receives and processes packets from the first NIC 100-2 as indicated by reference numeral 315, and transmits the packets to the other first NIC 100-2 as indicated by reference numeral 316 if necessary.

Although, in this embodiment, only a physical structure for unidirectional packet transfer is shown for ease of understanding, a duplex type can be applied when applying the invention to a practical network. In other words, although the traffic inputs 301 and 311 of the first NICs 100-1 and 100-2 are made only with RX0 in FIG. 3, it is practically possible to input 301 and 311 traffic with the opposite port RX3 and transmit 308 and 318 traffic with TX0.

Figure 4:
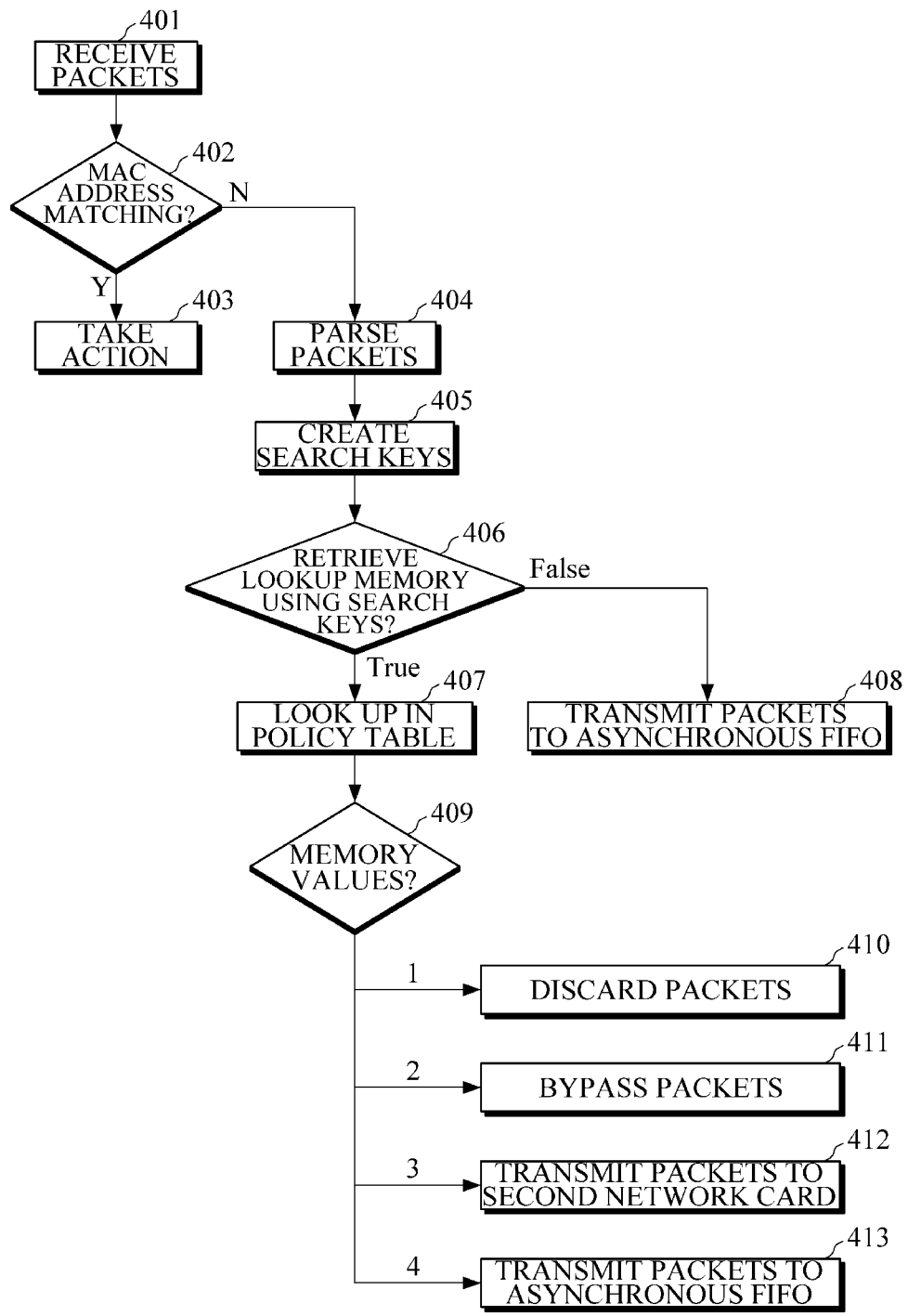
FIG. 4 is a diagram illustrating an example of a traffic classifying and filtering method of a first NIC according to an embodiment of the present invention.

FIG. 4 is a diagram illustrating an example of a traffic classifying and filtering method of first NICs 100-1 and 100-2 according to an embodiment of the present invention.

The first NICs 100-1 and 100-2 receive in operation 401 packets through traffic input interfaces 301 and 311. In addition, MAC address matching is attempted in operation 402 to cope with a result of processing packets based on MAC addresses. As a result of attempting matching, if matching is made, a predetermined corresponding action is taken in operation 403. In contrast, if the MAC address of the input packet as a result of attempting matching does not correspond to pre-selected rules, the packets are parsed in operation 404 to classify them.

Subsequently, the first NICs 100-1 and 100-2 retrieve a lookup memory storing classifying policies, using distinguishable fields of the header contents of the parsed packets, which include a source address, a destination address, a protocol, a source port, a destination port, etc. According to an embodiment, the first NICs 100-1 and 100-2 create search keys in operation 405 using pre-defined field values for headers, and retrieve the lookup memory storing the classifying policies in operation 406 using the search keys created. If "true" is a result of retrieving the lookup memory in operation 406, a table is looked up in operation 407 based on a rule index which the lookup memory returns. The corresponding actions of packets are predefined in the table.

Subsequently, the first NICs take a corresponding action based on a value 409 of a memory which the rule index indicates. Examples of the corresponding actions of packets include discarding the packets in operation 410, bypassing the packets in operation 411, or transmitting the packets to the second NIC 102 or to a network after storing the packets in asynchronous FIFO in operation 412. In contrast, if "false" is the result of retrieving the lookup memory in operation 406, the packets are transmitted to the asynchronous FIFO in operation 408.

Figure 5:
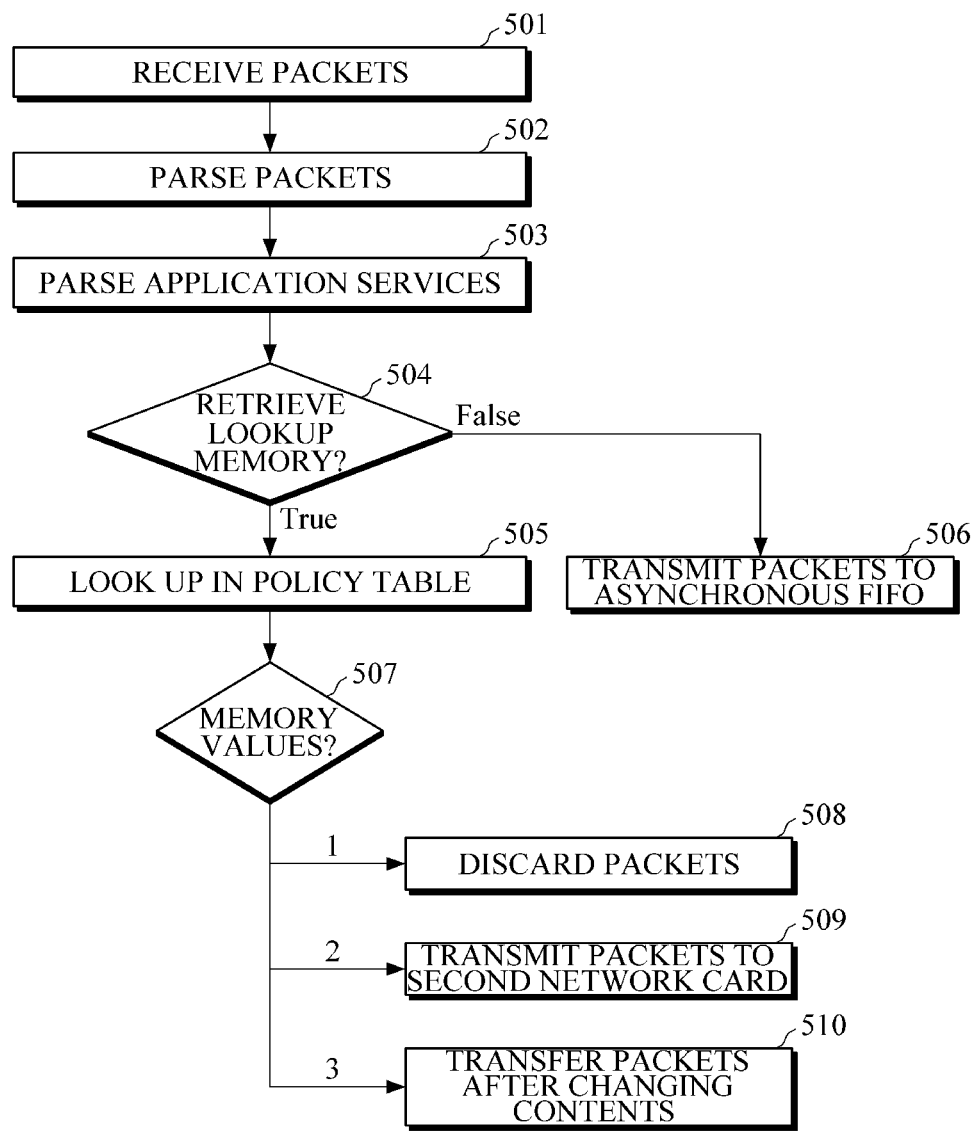
FIG. 5 is a diagram illustrating an example of a traffic inspection and engineering method of a second NIC according to an embodiment of the present invention.

FIG. 5 is a diagram illustrating an example of a precise traffic inspection and traffic engineering method of the second NIC 102 according to an embodiment of the present invention.

The second NIC 102 receives packets from the first NICs 100-1 and 100-2 in operation 501. Then, the second NIC 102 parses corresponding packets in operation 502, and parses application services to provide network application services required for specific services in operation 503. The specific services can include, for example, Skype service recognition, VoIP traffic management, P2P traffic control, and web-based traffic analysis.

Subsequently, the second NIC 102 retrieves the lookup memory storing application policies in operation 504 to know whether the parsed packets match the application policies. If the retrieving result is "true", a table is looked up in operation 505 based on a rule index which the lookup memory returns. The corresponding actions of packets are pre-defined in the table.

Subsequently, the second NIC 102 takes corresponding actions based on a value 507 of a memory which the rule index indicates. Examples of the corresponding actions of packets include, for example, packet discarding in operation 508, transfer of packets to the first NICs 100-1 and 100-2 in operation 509, and packet transfer in operation 510 after changing the payload of packets. In contrast, if the result of retrieving the lookup memory in operation 504 is "false", the packets are transmitted to the asynchronous FIFO in operation 506.

Figure 6:
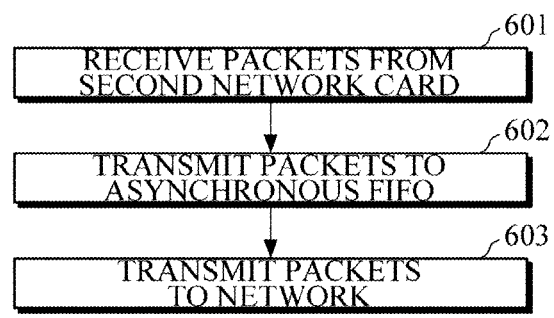
FIG. 6 is a diagram illustrating an example of processing of traffic received from a second NIC by a first NIC according to an embodiment of the present invention.

FIG. 6 is a diagram illustrating an example of processing of traffic received from the second NIC 102 by the first NICs 100-1 and 100-2 according to an embodiment of the present invention.

If the first NICs 100-1 and 100-2 receive packets from the second NIC 102 in operation 601, then the packets are stored in the asynchronous FIFO in operation 602. Subsequently, the packets stored in the asynchronous FIFO are transmitted to a network in operation 603.

While the invention has been described above with reference to various embodiments, it will be understood that changes and modifications may be made without departing from the scope of the invention, which is defined by the appended claims and their equivalents.

The present invention can be implemented as computer-readable codes in a computer-readable recording medium. The computer-readable recording medium includes all types of recording media in which computer-readable data are stored. Examples of the computer-readable recording medium include a ROM, a RAM, a CD-ROM, a magnetic tape, a floppy disk, and an optical data storage. Further, the recording medium may be implemented in the form of carrier waves such as those used for Internet transmission. In addition, the computer-readable recording medium may be distributed to computer systems over a network, in which computer-readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A network device comprising:
a first network card configured to classify input packets, filter and discard a first packet of classified packets, and transmit a second packet of the classified packets to a second network card;
the second network card configured to perform deep packet inspection and processing of the second packet received by the first network card;
a processor configured to manage the first and second network cards and apply network policies to the first and second network cards, respectively,
wherein the first network card filters and discards the packets corresponding to second to fourth layers of the input packets, transmits the packets requiring inspection and not corresponding to the second to fourth layers to the second network card, and transmits other normal packets to networks,
wherein the deep packet inspection comprises parsing application services from the packets, retrieving applications policies, and attempting to match the application services with corresponding application policies, and
wherein the second network card transfers the packets back to the first network card after changing a payload of the packets according to a matching result of the deep packet inspection,
wherein the first network card:
receives packets from the second network card,
stores the packets received in an asynchronous first in a first out (FIFO) device, and
transmits the packets stored to a network; and
a memory configured to store the network policies.

2. The device of claim 1, wherein the first network card classifies packets using at least one of a source IP address, a destination IP address, a source port, a destination port, a protocol, and an interface port.

3. The device of claim 1, wherein the first network card comprises a physical port configured to receive packets from a network, another physical port configured to transmit packets to the network, another physical port configured to transmit packets to the second network card, and another physical port configured to receive packets from the second network card.

4. The device of claim 1, wherein the first network card stores received packets in the asynchronous FIFO device and then transmits the packets to the network, if the packets are received from the second network card through an inner physical port.

5. The device of claim 1, wherein the second network card inspects a payload of packets corresponding to layer 5 to layer 7 of the packets classified by the first network card.

6. The device of claim 1, wherein the second network card inspects at least one of billing, service quality, security service, and application acceleration.

7. The device of claim 1, wherein the first network card is more than one and the second network card consists a number of sub blocks corresponding to a number of the first network card.

8. The device of claim 1, wherein the memory receives and stores various network policies including traffic classifying, traffic filtering and application policies from a policy server.

9. A method of processing traffic using a first network card and a second network card at a network device, comprising:
    classifying, at the first network card, input packets, filtering and discarding a first packet of classified packets, and transmitting a second packet of the classified packets to the second network card; and
    performing deep packet inspection and processing of the second packet received by the first network card at the second network card,
    wherein the first network card filters and discards the packets corresponding to second to fourth layers of the input packets, transmits the packets requiring inspection and not corresponding to the second to fourth layers to the second network card, and transmits other normal packets to networks,
    wherein the deep packet inspection comprises parsing application services from the packets, retrieving applications policies, and attempting to match the application services with corresponding application policies, and
    wherein the second network card transfers the packets back to the first network card after changing a payload of the packets according to a matching result of the deep packet inspection,
    wherein the first network card:
        receives packets from the second network card,
        stores the packets received in an asynchronous first in first out (FIFO) device, and transmits the packets stored to a network.

10. The method of claim 9, wherein the classifying and filtering of the traffic comprises:
    attempting media access controller (MAC) address matching on packets received;
    parsing corresponding packets if the MAC address of a received packet does not correspond to a pre-selected rule as a result of attempting the matching;
    creating search keys to retrieve whether the parsed packets match classifying policies and looking up in a table storing the classifying policies using the search keys created; and
    processing packets according to pre-defined actions based on a memory value indicated by an index, if a corresponding index exists as a result of looking up the table.

11. The method of claim 10, wherein the processing of the packets according to pre-defined actions comprises at least one of:
    discarding packets;
    bypassing the packets;
    transmitting the packets to the second network card; and
    transmitting the packets to a network after storing them in the asynchronous FIFO device.

12. The method of claim 9, wherein the inspecting and processing of the traffic classified by the first network card comprises:
    receiving the packets from the first network card;
    retrieving memory values with predefined actions matching the application policies; and
    processing the packets according to the memory values retrieved.

13. The method of claim 12, wherein the processing of the packets according to the memory values retrieved comprises at least one of:
    discarding the packets;
    transmitting the packets to a network card after storing them in the asynchronous FIFO device; and
    transferring the packets after changing payload of the packets.

* * * * *